3,159,671
PROCESS FOR MAKING o-HYDROXY-
BENZOIC ACIDS
Warren W. Kaeding, Concord, and Alexander T. Shulgin,
Berkeley, Calif., assignors to The Dow Chemical Company, Midland, Mich., a corporation of Delaware
No Drawing. Filed May 15, 1961, Ser. No. 109,846
6 Claims. (Cl. 260—521)

This invention relates to a new process for making o-hydroxybenzoic acids and particularly relates to a method for making salicylic acid and lower alkyl substituted salicylic acids.

Salicylic acid and its alkyl homologs are usually made by the well-known Kolbe-Schmitt synthesis wherein an alkali metal salt of a phenol is reacted with carbon dioxide. The reaction is carried out under pressure at elevated temperatures and usually in the absence of a solvent. Certain substituted salicylic acids cannot be made or are made only with difficulty by this process.

It has now been found that salicyclic acid and its lower alkyl substituted homologs may be made from the corresponding benzoic acid by a hydroxylation reaction which takes place in the thermal decomposition of its basic cupric salt. These basic salts may be represented by the general formula

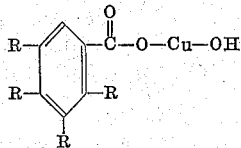

wherein each R is hydrogen or a lower alkyl radical containing from 1–4 carbon atoms, inclusive. The decomposition of these basic cupric benzoates to a salicylic acid is accomplished by heating the basic salt to a temperature between about 200° and 250° C. for from about 1 to 100 minutes. When these basic salts are decomposed in this manner, salicylic acids are formed with a minimum of isomeric or other acidic by-products. This process offers a new approach to the synthesis of salicylic acid and alkylsalicylic acids. Through its use, alkylsalicylic acids may be made which are difficult or impossible to prepare by some of the known methods. For example, 2,6-cresotic acid is not readily made by conventional methods, but it is easily prepared as a pure compound by our new process.

The thermal decomposition may conveniently be carried out with the basic cupric benzoate suspended in an inert solvent which serves as a heat transfer medium and may also serve as a solvent during the work-up of the decomposed product. Solvents most suitable for the purpose are organic liquids which are not reactive with the reactant and product, which are stable at the temperatures employed, and which have a boiling point at least as high as the reaction temperature. Solvents which are satisfactory for the process include diphenylmethane, biphenyl, diphenyl ether, tetradecane, and the like.

The thermal decomposition may be run under pressure in a solvent of lower boiling point, but there is usually no other advantage to be gained by so doing.

The decomposition process may also be carried out in the absence of a solvent. In some cases, particularly on a small scale, this may be a convenient method of operation.

When the thermal decomposition is carried out at 200–250° C., preferably at about 200–230° C., more or less time is required for the desired amount of decomposition depending upon the temperature and the particular salt being decomposed. Ordinarily, from about 5 to about 30 minutes is sufficient.

The salicylic acid and the unchanged benzoic acid are conveniently liberated by acidifying the reaction mixture with a suitably strong acid such as hydrochloric or sulfuric acid. The free carboxylic acids may then be separated from the copper content by extraction with an organic solvent. The salicylic and benzoic acids may be separated from each other by any of several known methods for doing so. A satisfactory separation procedure is described in Example 1. The copper content of the reaction product is at least partially in the cuprous state at the end of the decomposition process. It may be separated from the benzoic acid and salicylic acid components, converted to suitable cupric salts, and reused in the process.

The basic cupric benzoates may be prepared in any of several ways. A satisfactory method involves the hydrolysis of the normal cupric salt, that is, the cupric dibenzoate by adding water to its boiling acetone solution until a substantial amount of the light blue basic cupric benzoate is precipitated. The precipitated basic salt is then filtered off and washed with hot acetone. This method gives a very pure product.

Basic cupric benzoates may also be prepared by adding a water solution of one molar equivalent of a water-soluble cupric salt such as cupric sulfate or cupric nitrate at room temperature to an aqueous solution containing one molar equivalent of the sodium benzoate and one molar equivalent of sodium hydroxide. The basic cupric benzoate is precipitated and may be filtered off and washed with water to give a product identical to that obtained by the hydrolysis method.

The structure of the basic cupric benzoates is conveniently represented by the general formula previously shown although the actual structure is not known. It is sometimes considered to be a dimeric structure and written as a double salt, for example,

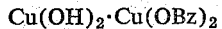

Bz representing a benzoyl radical. The identity of the basic salt as a single definite chemical compound, however, remains the same.

*Example 1*

A flask equipped with a stirrer, a condenser, and a thermometer was charged with 8.0 g. of basic cupric benzoate and 100 cc. of diphenylmethane and the base of the flask was immersed in a liquid heating bath. The basic cupric benzoate-diphenylmethane slurry was stirred and heated from room temperature to 212° C. in eight minutes and then maintained at 212° C. for an additional five minutes. The reaction mixture was then cooled, about 75 cc. of ethyl ether was added, and the stirred suspension was treated with an excess of dry HCl gas, thereby precipitating the copper as the insoluble chloride which was removed by filtration. The free carboxylic acids were then extracted from the filtrate with aqueous saturated sodium bicarbonate solution. Acidification of the bicarbonate solution with HCl released the carboxylic acids and then were extracted with methylene chloride. The salicyclic acid product was separated from the unreacted benzoic acid by a countercurrent extraction method utilizing the methylene chloride extract and 0.1 molar aqueous ferric chloride. The ferric-salicylic acid complex remained in the aqueous phase and the separation was complete in about 10–12 transfers. The aqueous ferric chloride extracts containing the product were combined, made alkaline with sodium hydroxide, and warmed. The precipitated ferric hydroxide was filtered off and the filtrate was acidified with hydrochloric acid and extracted with methylene chloride. Evaporation of the solvent from the extract yielded 0.7 g. of salicyclic acid. By evaporation of the original extracted methylene chloride solution, there was recovered 4.0 g. of benzoic acid.

*Example 2*

A dispersion of 8.0 g. of basic cupric o-toluate in 100 cc. of diphenylmethane was heated in the apparatus of Example 1 to 212° C. in about 6.5 minutes and it was maintained at this temperature for approximately twelve minutes. The reaction mixture was then cooled and extracted to separate the components as described in Example 1. There was obtained 0.26 g. of 2,6-cresotic acid and 4.0 g. of recovered o-toluic acid.

The thermal decomposition may also be carried out by heating the dry basic copper salt. A longer heating period is required and more color is developed in the product although only traces of tarry by-products are found. Examples 3 and 4 illustrate the pyrolysis of dry salts.

*Example 3*

A quantity of 10.0 g. of basic cupric p-toluate was put in a small flask equipped with a thermometer and having the base immersed in a liquid heating bath. The contents of the flask were heated without stirring to 220° C. in 30 minutes and this temperature was maintained for a further 30 minutes. The pyrolyzed salt was then cooled to room temperature whereupon it lost the black color which had developed during the heating period and turned a greenish-brown color. This salt was worked up and the two acid components were separated in a manner similar to that described in Example 1 except for a treatment with activated charcoal to remove color. The decolorizing step caused an appreciable loss in yield. There was obtained 0.87 g. of 2,4-cresotic acid and 3.8 g. of recovered p-toluic acid.

*Example 4*

In the manner described in Example 3, 10 g. of dry basic cupric m-toluate was heated 32 minutes at 220° C. and the acidic components were separated from the product. A yield of 0.52 g. of 2,5-cresotic acid contaminated with a small proportion of 2,3-cresotic acid was obtained along with 4.8 g. of recovered m-toluic acid.

By the procedures described in the foregoing examples, other lower alkyl salicylic acids may be prepared. For example, 6-ethylsalicylic acid may be obtained by thermally decomposing basic cupric o-ethylbenzoate and acidifying the product, 4-tert.-butylsalicylic acid is similarly obtained from basic cupric p-tert.-butylbenzoate, and 5-isopropylsalicylic acid may be prepared in the same way from basic cupric m-isopropylbenzoate. Salicylic acids having more alkyl substituents on the benzene ring are similarly prepared. In the manner described, the basic cupric salt of 3,5-di-tert.-butylbenzoic acid may be converted to 3,5-di-tert.-butylsalicylic acid, 3,4,6-trimethylsalicylic acid may be made from 2,4,5-trimethylbenzoic acid, and 3,4,5,6-tetramethylsalicylic acid may be made from 2,3,4,5-tetramethylbenzoic acid.

We claim:

1. A process for preparing o-hydroxybenzoic acids which comprises thermally decomposing a compound of the general formula:

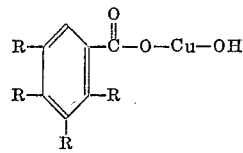

wherein each R is taken from the group consisting of hydrogen and lower alkyl radicals containing 1–4 carbon atoms, inclusive, by heating said compound at between about 200° C. and 250° C. for from about 1 to 100 minutes.

2. The process of claim 1 wherein at least three of the R's are hydrogen.

3. A process for preparing salicylic acid which comprises thermally decomposing basic cupric benzoate by heating said cupric salt at between about 200° and 250° C. for from about 1 to 100 minutes.

4. A process for preparing 2,6-cresotic acid which comprises thermally decomposing basic cupric o-toluate by heating said cupric salt at between about 200° and 250° C. for from about 1 to 100 minutes.

5. A process for preparing 2,5-cresotic acid which comprises thermally decomposing basic cupric m-toluate by heating said cupric salt at between about 200° and 250° C. for from about 1 to 100 minutes.

6. A process for preparing 2,4-cresotic acid which comprises thermally decomposing basic cupric p-toluate by heating said cupric salt at between about 200° and 250° C. for from 1 to 100 minutes.

References Cited in the file of this patent
UNITED STATES PATENTS
2,727,924    Pearlman _____ Dec. 20, 1955